Aug. 21, 1951      J. R. LEIGHTON      2,565,381
DEVICE FOR MEASURING ANGULAR BODY MOVEMENTS
Filed Aug. 15, 1949      2 Sheets-Sheet 1
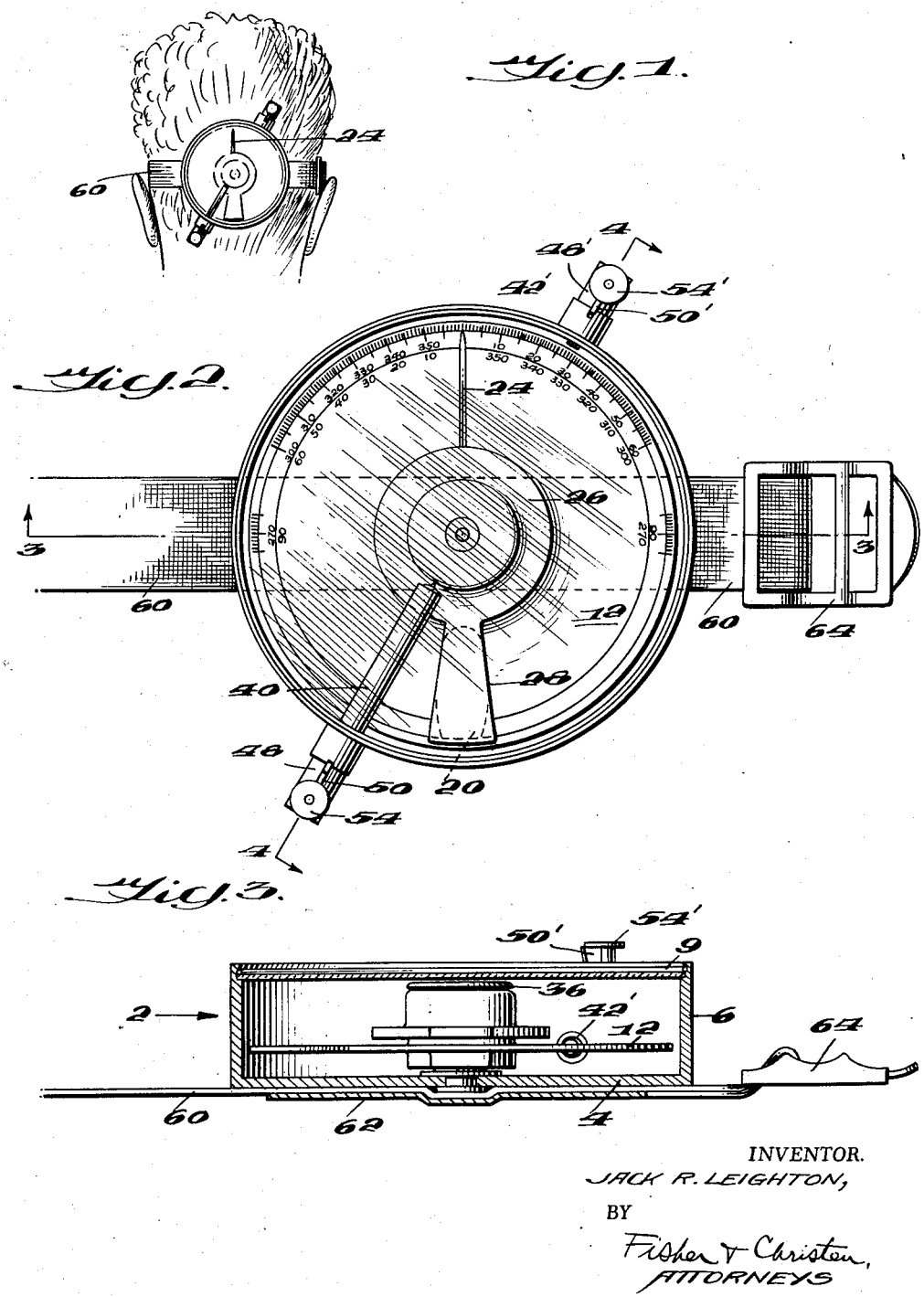
INVENTOR.
JACK R. LEIGHTON,
BY
Fisher & Christen,
ATTORNEYS Aug. 21, 1951 J. R. LEIGHTON 2,565,381
DEVICE FOR MEASURING ANGULAR BODY MOVEMENTS
Filed Aug. 15, 1949 2 Sheets-Sheet 2

INVENTOR.
JACK R. LEIGHTON,
BY
Fisher & Christen,
ATTORNEYS

Patented Aug. 21, 1951

2,565,381

UNITED STATES PATENT OFFICE 2,565,381

DEVICE FOR MEASURING ANGULAR BODY MOVEMENTS

Jack R. Leighton, Vancouver, Wash.

Application August 15, 1949, Serial No. 110,323

1 Claim. (Cl. 33—221)

This invention is a therapeutic method and apparatus and more particularly is for measuring the amount of flexion of the various joints of the human body. The invention is useful in making physical examinations, and in ascertaining whether or not particular treatments are improving the joints or condition being treated.

As a result of certain pathologic conditions resulting for example, from poliomyelitis, arthritis, rheumatism, fractures, etc. the normal flexibility of the various joints of the human body may be impaired to a greater or less degree and such impaired flexibility can be remedied by various well known types of treatment, such as massage, exercise, infra red rays or other types of heat treatment. The joint involved, however, may respond only slowly to such treatments and it is important for the practitioner to know accurately whether the condition is improving and just how much it is improving.

The principal object of the present invention is to provide a method and apparatus for accurately and quantitatively measuring the amount of flexing or bending a particular joint is capable of at a particular time, so that the practitioner may know accurately whether the flexing is normal or not, and if not, the degree of impairment. Where the patient is undergoing treatment, the practitioner is able accurately to ascertain the degree of improvement taking place from time to time.

More specifically, another important object of the invention is to provide an apparatus which can be strapped to a part of the human body, which apparatus comprises essentially two relatively angularly movable members, one of which remains in the starting position and acts as a standard, while the other is angularly displaced by the bending of the joint involved with respect to the standard so that the flexing of the particular joint being observed may be accurately measured in degrees.

The apparatus comprises, in the preferred embodiment, a weighted pointer which serves as a standard of position, the pointer being provided with a weight for holding it in the vertical or starting position. Cooperating with this pointer is a calibrated dial, also provided with a weight for holding it in a predetermined starting position. The pointer and dial are pivoted on a common axis. The dial is provided with suitable connections such as a strap and buckle for strapping it to the part of the body so that it will partake of the angular movements of the portion of the body to which it is attached. When the joint is bent, the dial moves about its axis, the pointer remaining in the vertical position and the angular displacement between the two read off in degrees on the dial.

An important feature of the invention is that the dial, and also the pointer, may be latched or held in any desired position. This feature is important, in that as soon as the joint is flexed the maximum or desired amount, the two relatively movable members may be latched or held in such angular position so that the reading of the instrument may be held fixed as long as is necessary and particularly for giving the operator an opportunity for making a record of the reading.

Further structural and functional features of the invention will now be described in connection with the accompanying drawings, in which:

Fig. 1 is a view showing the instrument in use for measuring the flexion of the neck of the patient;

Fig. 2 is a plan view of the instrument;

Fig. 3 is a section on the line 3—3 of Fig. 2;

Fig. 4 is a section on the line 4—4 of Fig. 2; and

Fig. 5 is an exploded view showing the graduated dial and cooperating pointer.

Referring now to these figures wherein similar reference characters indicate similar parts, the apparatus comprises a shallow cylindrical casing indicated generally at 2 having a back wall 4, side wall 6 and glass cover 8 held in place by a bezel wire 9.

Secured in the center of the back wall 4 is a pivot stud 10 and freely and rotatably mounted on the stud 10 is a calibrated dial 12, the hub 14 of the dial and a bearing sleeve 16 on the stud 10 being formed as cooperating raceways for ball bearings 18. The dial is provided with the usual calibrations from zero degrees to 360 degrees reading in both directions around the dial. The dial is also provided with a weight 20 which normally serves to hold the dial 12 with the zero degree mark at the top of the dial.

Also mounted on the pivot 10 is a pointer member comprising an indicating pointer or needle 24, the hub 26, and weight 28 opposite pointer 24.

The interior of hub 26 is provided with bearing sleeve 30 and the pivot 10 is provided with a bearing sleeve 32, these sleeves cooperating to form a raceway for ball bearings 34 whereby the pointer is freely rotatable on the pivot 10. A screw cap 36 holds the parts described in place on the pivot.

The dial 12 and pointer 22 as so far described are freely rotatable about stud 10 as a common pivotal axis. However, each of these members may be latched or held in any desired position by manually settable means, which will now be described.

Figures 4, 5:
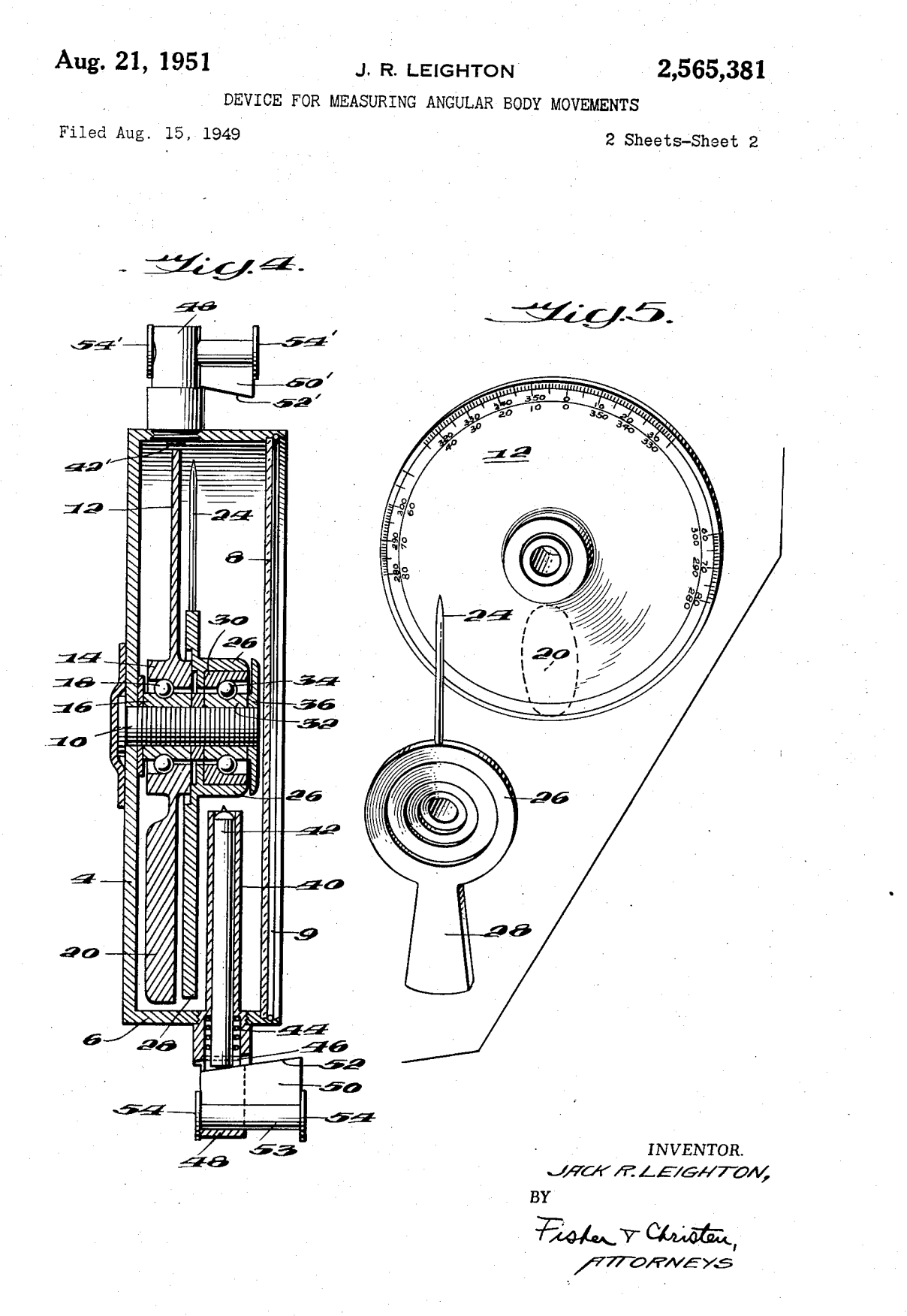

The latching means for the pointer 24 comprises a radially positioned cylinder 40, Fig. 4, mounted in a sidewall 6 of the casing. Radially movable within this cylinder is a latch pin 42 normally urged outwardly to the disengaged or unlatched position by a coil spring 44 pushing against a pin 46 in the outer end of the latch pin 42. The outer portion of cylinder 40 indicated generally at 48 is transversely slotted to slidably receive a manually operated cam 50 having an edge 52 bearing against the outer edge of the latch pin 42. The cam 50 includes a cylindrical portion 53 carrying the cam blade 50 and the two ends of 53 are provided with disks 54 for serving as finger pieces for operating the cam in either direction, and for limiting the lateral movements of the cam.

From the foregoing description it will be evident if the cam 50, Fig. 4, is pushed to the left, latch pin 42 will be cammed radially inwardly and will bear against hub 26 of the pointer to lock or latch the pointer in whatever position it may be at the time.

Similar latching or holding means is provided for latching or holding the dial 12, such latching means being shown at the top of Fig. 4, corresponding elements being indicated by corresponding primed reference characters.

In order to secure the device to the portion of the human body whose angular deflection is being measured, the back wall 4 has secured thereto a strap 60 in any convenient way, as by a spaced cleat 62 carried by the back wall 4, spaced from the back wall to provide a slot through which the strap 60 passes, the strap being secured in the slot by cement or a stud.

One end of the strap 60 is provided by a conventional buckle 64.

Operation

The described apparatus operates as follows:

If, for example, the operator is measuring the amount of flexion of the neck, as shown in Fig. 1, the apparatus is strapped around the head of the user as shown. The dial 12 and the pointer 24 are at this stage freely rotatable so that the zero point of the dial is at the top of the dial, and the pointer which, at this stage, is vertical is at the zero point on the dial. Cam 50' is manually operated to press in latch pin 42' to latch the dial in a fixed position. Pointer 24 remains in the vertical position and serves as a standard of position. The patient now bends his neck as far as possible, to the right for example, and this will move the calibrated dial 21 an amount in degrees corresponding to the angular flexion, whereupon the other cam 50 is operated to cause latch pin 42 to lock the pointer 24 and the two remain thus locked until the operator has had the opportunity to record the angular deflection of the dial. After this has been completed, the two cams 50 and 50' are operated to release the dial whereupon their respective weights cause them to move back to their starting position and the operation is repeated for measuring the flexion of the neck to the other side.

Similarly the flexion or the degree of bending of which any joint of the body is capable may be accurately measured and recorded from time to time and thereby the improvement of the patient may be quantitatively and accurately ascertained.

As illustrative of the technique of measuring particular joints, the following examples are given:

Flexion and extension of the neck

*Starting position.*—The subject is in supine position on a bench, with the head and neck projecting over the end of the bench, shoulders touching edge, arms at side. The instrument is fastened to either side of head over the ear.

*Movement.*—Count (1), head is raised and moved to position as near chest as possible, dial locked. Count (2), head is lowered and moved to a position as near the end of bench as possible. Count (3), pointer locked. Subject relaxes, reading taken.

*Caution.*—Shoulders should not be raised from bench during flexion, nor back unduly arched during extension. Buttocks and shoulders must remain on bench during movement.

Lateral flexion of the neck

*Starting position.*—The subject is in sitting position in a low-backed armchair, back straight, hands grasping chair arms, upper arms hooked over back of chair. The instrument fastened to back of head.

*Movement.*—Count (1), head is moved in arc sideward to the left as far as possible, dial locked. Count (2), head is moved in arc sideward to the right as far as possible, pointer locked. Count (3), subject relaxes, reading taken.

*Caution.*—Position in chair may not be changed during movement. Shoulders may not be raised or lowered.

Rotation of the neck

*Starting position.*—The subject is in supine position on bench, with the head and neck projecting over, shoulders touching edge and arms at sides of bench. The instrument is fastened to the top of the head.

*Movement.*—Count (1), head is turned left as far as possible, dial locked. Count (2), head is turned to right as far as possible, pointer locked. Count (3), subject relaxes, reading taken.

*Caution.*—Shoulders may not be raised from bench.

Flexion and extension of the elbow

*Starting position.*—The subject is in squatting or sitting position facing a table or bench with the upper portion of arm being measured resting back down across nearest table corner so that the elbow extends just beyond one edge and the armpit is resting against the adjacent edge. The instrument is fastened to back of the wrist.

*Movement.*—Count (1), wrist is moved upward and backward in an arc to position as near shoulder as possible, dial locked. Count (2), wrist is moved forward and downward until arm is forcibly extended. Count (3), pointer locked. Subject relaxes, reading taken.

*Caution.*—Upper arm may not be tilted or moved during measurement.

Flexion and extension of the hip

*Starting position.*—The subject is in standing position, feet together, knees stiff, arms extended above head, hands clasped with palms up. The instrument is fastened to either side of hip at height of the umbilicus.

*Movement.*—Count (1), bend backward as far as possible, dial locked. Count (2), bend forward as far as possible. Count (3), pointer locked. Subject relaxes, reading taken.

*Caution.*—Knees may not be bent but must remain straight throughout movement. Feet may not be shifted. Toes and heels may not be raised.

Adduction and abduction of the hip

*Starting position.*—The subject is in standing position, feet together, knees straight, arms at sides. The instrument is fastened to back of either leg.

*Movement.*—Count (1), starting position, dial locked. Count (2), leg to which instrument is not attached is moved sideward as far as possible. Count (3), pointer locked. Subject relaxes, reading taken.

*Caution.*—Body must remain in upright position throughout movement. Knees must be kept straight with the feet assuming a position on line and parallel.

Rotation of the hip

*Starting position.*—The subject is in sitting position on bench with left or right leg resting on and foot projecting over end of bench, knee straight, right or left leg extending downward, foot resting on floor. Instrument is fastened to bottom of left or right foot.

*Movement.*—Count (1), left or right foot is turned outward as far as possible, dial locked. Count (2), left or right foot turned inward as far as possible. Count (3), pointer locked. Subject relaxes, reading taken.

*Caution.*—Knee and ankle joints must remain locked throughout movement. Position of hips may not be changed during measurement.

Flexion and extension of the knee.

*Starting position.*—The subject is in prone position on a box or bench with knees at end of and lower legs extending beyond end of the bench, arms at sides of and hands grasping edges of bench. Instrument fastened to outside of either ankle.

*Movement.*—Count (1), foot is moved upward and backward in an arc to position as near buttocks as possible, dial locked. Count (2), foot is moved forward and downward until leg is forcibly extended. Count (3), pointer locked. Subject relaxes, reading taken.

*Caution.*—Position of upper leg may not be changed during movement.

Similar and analogous procedures may be used for other joints such as the shoulder, radial-ulnar, wrist, ankle, trunk, etc.

While the preferred construction of the device has been described in considerable detail, it should be understood that the invention is not to be limited to the precise details shown, but may be carried out in other ways.

I claim:

Apparatus for measuring the angle of flexion of joints of the human body, comprising a casing, strap means carried by the back of the casing for fastening the back of the casing against a portion of the human body, a calibrated dial facing the front of the casing and readable from the front of the casing, said dial being rotatably mounted and provided with an off-center weight, a pointer, rotatably mounted to move over the front of said calibrated dial, and provided with an off-center weight, and including a hub portion, a transparent cover carried by the casing and enclosing said dial and pointer, a manually operated, radially movable latch carried by one side of the casing and adapted to engage said hub portion of the pointer, and a manually operated, radially movable latch carried at the opposite side of the casing and adapted to engage the rim of said dial.

JACK R. LEIGHTON.

REFERENCES CITED

The following references are of record in the file of this patent:

UNITED STATES PATENTS

| Number | Name | Date |
|---|---|---|
| 221,380 | Winter | Nov. 4, 1879 |
| 920,718 | Bernard | May 4, 1909 |
| 1,120,737 | Nielsen | Dec. 15, 1914 |
| 1,401,146 | Falconer | Dec. 27, 1921 |
| 1,520,429 | Newton | Dec. 23, 1924 |
| 2,022,452 | Aegerter | Nov. 26, 1935 |
| 2,383,527 | Whitechester | Aug. 28, 1945 |